US005509187A

United States Patent [19]

Gold

[11] Patent Number: 5,509,187

[45] Date of Patent: Apr. 23, 1996

[54] METHOD OF REPLACING A WINDSHIELD UTILIZING A KNIFE FOR REMOVING SCALANT

[76] Inventor: Peter Gold, 389 Peninsula Blvd., Hempstead, N.Y. 11550

[21] Appl. No.: 414,380

[22] Filed: Mar. 31, 1995

[51] Int. Cl.[6] ................................ B23P 19/04; B26B 3/00

[52] U.S. Cl. ......................... 29/402.08; 29/426.4; 30/280; 30/342

[58] Field of Search ................................ 29/426.4, 426.1, 29/402.01, 402.03, 402.08; 30/329, 342, 280

[56] References Cited

U.S. PATENT DOCUMENTS

| | | | |
|---|---|---|---|
| 4,080,734 | 3/1978 | Barbour | 29/275 X |
| 4,694,576 | 9/1987 | Cothery | 30/342 X |
| 4,955,124 | 9/1990 | Asbery | 29/426.4 |
| 5,421,230 | 6/1995 | Flaherty et al. | 29/426.4 |

*Primary Examiner*—Peter Vo
*Assistant Examiner*—Khan V. Nguyen

[57] ABSTRACT

A method of removing hardened urethane from about a defective windshield using a two-bladed knife in which one blade follows along a straight path and the other along a wavy path due to varying reissuance to cutting of the urethane, such that the wavy path brings the one blade closer to the other blade and results in engaging severed urethane between the blades and in this manner facilitates the removal of the engaged urethane as the knife is continued along its cutting stroke.

1 Claim, 1 Drawing Sheet

METHOD OF REPLACING A WINDSHIELD UTILIZING A KNIFE FOR REMOVING SCALANT

The present invention relates generally to improvements in an auto windshield installation method and knife for practicing the method, the improvements more particularly significantly facilitating the removal of cured urethane which bonds a defective windshield requiring replacement in its installed position in the front of the auto, so that the defective windshield once freed of its bond is readily removed and a replacement windshield installed in its place.

Example Of The Prior Art

A solution to the same problem of removing cured or hardened urethane from about the peripheral edge of a defective auto windshield is addressed in U.S. Pat. 4,694,576 issued to Jeffrey R. Cothery for "Tool For Removing Windshield Sealant" on Sep. 22, 1987. The patented tool has a rigid U-shaped blade component embodied with two honed cutting edges on the legs of the U-shape which impart two parallel cuts into the urethane. While the urethane strip between the parallel cuts is easier to remove than was the case using only a single blade tool, it remains a task that is tedious and, being labor-intensive, an expensive aspect of auto windshield replacement.

Broadly, it is an object of the present invention to provide a method of removing a defective windshield preparatory to the replacement thereof overcoming the foregoing and other shortcomings of the prior art.

More particularly, it is an object to impart simultaneous cuts in the hardened urethane in non-parallel relation, such that two blades used for this purpose engage therebetween the urethane strip between the cuts and pull the strip free of the urethane mass, all to the end of significantly improving upon Cothery and all other known prior art techniques of urethane removal in auto windshield replacement, as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 2:
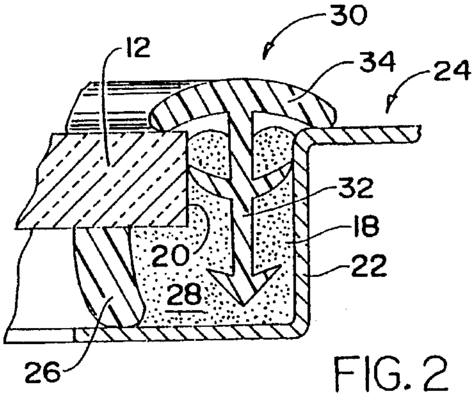
FIG. 2 is a partial cross sectional view taken along line 2—2 of FIG. 1 illustrating the engaged condition of the defective windshield effected by cured urethane requiring removal incident to removal of the defective windshield.
Figure 3:
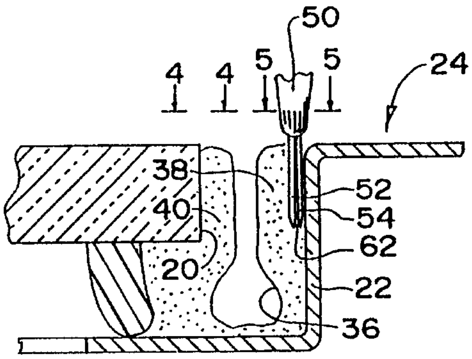
FIG. 3 is a cross sectional view similar to FIG. 2 illustrating a preliminary stage of removal of the cured urethane.
Figure 7:
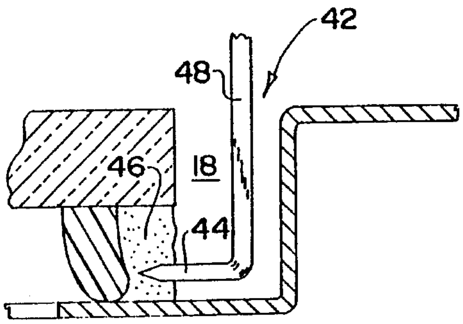
FIG. 7 (PRIOR ART)
Figure 4:
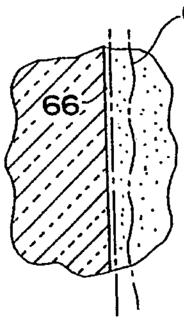
Figure 5:
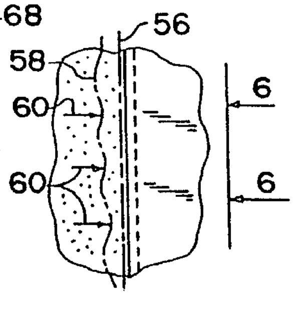
Figure 6:
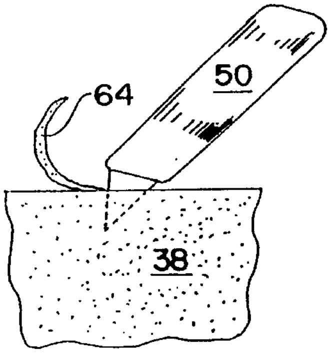
Figure 8:
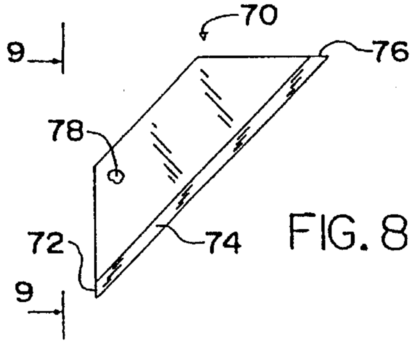
Figure 9:
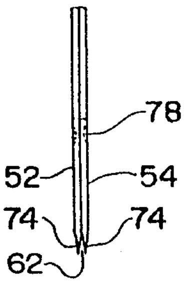

FIGS. 4 and 5 are plan views as taken respectively along lines 4—4 and 5—5 of FIG. 3 illustrating subsequent stages of removal of the cured urethane;

FIG. 6 is a partial side elevational view as seen in the direction of arrows 6—6 of FIG. 5 with the wall 22 omitted to better illustrate details of the removal of the cured urethane;

FIG. 7 is a partial cross sectional view similar to FIG. 2, but illustrating a final stage of removal of the cured urethane;

FIG. 8 is an isolated side elevational view of a blade means used in the removal of the cured urethane; and FIG. 9 is a view of the blade means as taken along line 9—9 of FIG. 8.

Figure 1:
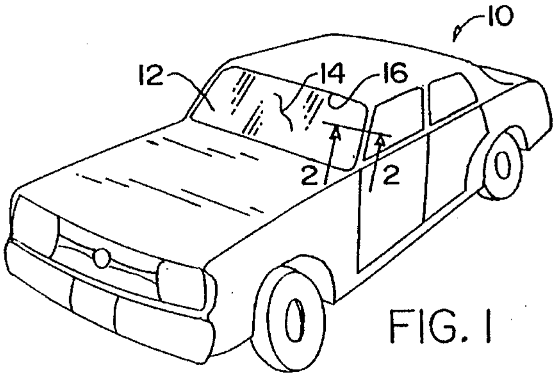
FIG. 1 is a perspective view of an auto with a defective windshield requiring replacement.

As background, reference should be made to FIG. 1 illustrating an auto 10 for which the original equipment manufacture (OEM) windshield 12 has developed, as often happens, a defect, such as a crack 14, and thus must be replaced. The replacement to such OEM equipment is done in a repair shop constituting part of what is commonly referred to as the "aftermarket" which services autos. The defective windshield 12, as best shown in FIG. 2 in conjunction with FIG. 1, is of the type that is generally rectangularly shaped and sized slightly smaller than the windshield opening 16 of the auto, so that, as best shown in FIG. 2, there is a gap 18 between the peripheral edge 20 of the windshield 12 and a wall 22 of a flange 24 of the auto which bounds the auto windshield opening 16. As is well known, the windshield 12 is supported on a dam 26 which confines a viscous deposit of urethane 28 within the gap 18 so that when the urethane hardens or cures, it serves as an attachment for maintaining the windshield 12 within the auto windshield opening 16 and also seals the gap 18 against rain seepage therethrough and other adverse effects of weather elements. A molding 30 of rubber construction material has a depending leg 32 embodied in the urethane for attachment thereto and also has a crown 34 which provides a finished external appearance to windshield 12.

To replace the defective windshield 12 it, of course, has to be extracted from the opening 16 and from its attachment to the urethane 28. As illustrated in FIG. 3, the molding 30 is removed by an appropriate pulling tool in a well known manner, leaving a void 36 and also remaining hardened urethane in areas 38 and 40 attached respectively to the opening-bounding wall 22 and the windshield peripheral edge 20. According to prior art practice, the urethane areas 38 and 40 are cleared by repetitious cutting off of strips of these areas using an ordinary bladed knife, until the gap 18 is open enough, as illustrated in FIG. 7 to insert a specially-made for the purpose right-angle cutting tool 42 which has a cutting end 44 which is readily projected into the urethane mass 46 beneath the windshield 12 and pulled by its handle 48 along the gap, which results in freeing the windshield 12 for removal from the windshield opening 16.

The current prior art practice of repetitious cutting of the urethane areas 38 and 40 to achieve the open gap 18 of FIG. 7 preparatory to use of the tool 42 is very time consuming and tedious, and is obviated by the within windshield replacement method. Underlying the present invention is the recognition that the hardened urethane presents a varying resistance to cutting in that it does not harden uniformly throughout its mass, and thus a blade urged along a cutting stroke through the urethane will not travel along a straight path but will deflect left and right, i.e. travel along a wavy path, as different hardnesses of urethane are encountered. A blade cutting, however, immediately adjacent the wall 22 and the windshield edge 20 will follow a nearly straight path due to the stabilizing effect of the straight configuration of the adjacent structures of the wall 22 and edge 20. Thus, in accordance with the present invention, the urethane areas 38 and 40 are removed using a special two-bladed knife, and during the cutting use thereof one blade travels along a straight path and the other along a wavy path, such that the latter blade when its wavy path brings it closer to the former blade, engages severed urethane between the blades and results in the facilitated removal of the engaged urethane as the knife is continued along its cutting stroke, all as will now be explained in detail.

More particularly, as best understood from FIG. 3 and FIGS. 4, 5, and 6, the within inventive method contemplates the use of a doubled-bladed knife 50 having two narrowly spaced apart blades 52 and 54, preferably approximately by not more than 1/16 of an inch, mounted to extend in cutting relation from the front of the knife. Starting at a location adjacent either the wall 22 or the windshield edge 20, the blades 52 and 54 are forced into the hardened urethane wherein, taking the circumstance depicted in FIG. 5, the inside blade 54 is adjacent the wall 22 and the outside blade 52 is located approximately 1/16 inch into the urethane area 38. Pulling knife 50 along a cutting stroke causes blade 54 to travel along a straight path 56 and blade 52 to simultaneously travel along a wavy path 58, such that when traveling along the wavy path the blade 52 moves alternately away from blade 54 and, more pertinent to the inventive method, also towards the blade 54 at locations individually and collectively designated 60. At the locations 60, blade 52 thus moves closer to blade 54, and the severed urethane entering through the clearance 62 between the blades 52, 54 is engaged by the blades and expelled as severed strips 64 (FIG. 6) as the knife 50 continues to be pulled through a cutting stroke. In practice, the cutting depicted in FIG. 5 and as just described is repeated, but significantly less than the repetitious slicing of strips to the full or near full depth of the gap 18 as is required using a single-bladed knife. As shown next in FIG. 6, urethane removal using the double-bladed knife 50 is repeated along the windshield peripheral edge 20, wherein blade 52 is on the inside, and blade 54 on the outside, the former traveling along the straight path 66 and the latter along the wavy path 68, to the same end of expelling severed urethane strips 64, as depicted in FIG. 6, during a cutting stroke of the knife 50.

The isolated views of FIGS. 8 and 9 illustrate the preferred embodiment of the blades 52, 54, each being of a known type having a body 70 of metal construction material and a trapezoidal shape presenting a front point 72, a honed edge 74, and a back point 76, which back point is ordinarily used in the prior art when the blade is turned 180 degrees after the front point 72 is dulled, but of less importance for the within invention since only the front point 72 is primarily intended for use. The honing of the edges 74 provide the 1/16 inch clearance 62 therebetween, and this clearance widens as the blade on the outside moves away from the blade on the inside while traveling along the wavy path noted. To control the extent of separation of the blades 52, 54, a spot weld 78 is used to hold the blades together at a selected location from the front point 72, such that total separation as might result in the snapping off of the outside blade is prevented, and yet the travel of this blade along a wavy path is not inhibited. Stated otherwise, the spot weld location is selected according to the springy nature or flexturing characteristics of the metal construction material of the blades, as readily determined by trial and error.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of practicing the within inventive method other than as defined in the appended claims.

What is claimed is:

1. A method of preparing an auto windshield opening for receiving in seated relation therein a replacement windshield for a defective windshield, said defective windshield being of a type of a generally rectangular shape having a peripheral edge in a clearance position inwardly of a wall bounding said windshield opening defining a gap therebetween and having cured urethane bonding said defective windshield peripheral edge to said gap-bounding windshield opening wall, said auto windshield preparation method comprising a first step of inserting two blades in adjacent position to each other with a selected nominal clearance therebetween to extend in cutting relation from a blade holder, a second step of inserting said blades incident to a cutting stroke into said cured urethane with a first blade adjacent said wall bounding said opening and a second adjacent blade located inwardly thereof so as to define an opening into said clearance of said blades in facing relation to a directional cutting stroke of said blades, a third step of urging said blades through a cutting stroke causing said first blade to move along a straight path due to the effect of said adjacent position of said opening-bounding wall and simultaneously causing said second blade to move along a wavy path alternately away from and towards said first blade due to the effect of varying resistance to cutting of said cured urethane, a fourth step of engaging urethane severed by said blades entering into said clearance between said blades incident to transverse closing movement of said second blade towards said first blade so that a continued cutting stroke movement pulls free said engaged urethane, and repeating the second, third and fourth steps adjacent said defective windshield peripheral edge, whereby said urethane is removed from said gap freeing said defective windshield and facilitating the seating in said auto windshield opening of said replacement windshield.

* * * * *